United States Patent [19]

Floryan

[11] 4,385,167
[45] May 24, 1983

[54] PREPARATION OF POLYPHENYLENE ETHER RESINS

[75] Inventor: Daniel E. Floryan, Pittsfield, Mass.

[73] Assignee: General Electric Company, Pittsfield, Mass.

[21] Appl. No.: 175,144

[22] Filed: Aug. 4, 1980

[51] Int. Cl.$^3$ ............................................. C08G 65/44
[52] U.S. Cl. .................... 528/215; 528/212; 528/217
[58] Field of Search ................ 528/212, 215, 216, 217

[56] References Cited

U.S. PATENT DOCUMENTS 3,306,875 2/1967 Hay ..................................... 528/215
3,544,515 12/1970 Katchman et al. .................. 528/215
3,544,516 12/1970 Katchman et al. .................. 528/215
3,787,362 1/1974 Bennett et al. ....................... 528/215
3,796,689 3/1974 Bennett et al. ....................... 528/215
4,058,504 11/1977 Yonemitsu et al. ................. 528/215
4,211,857 7/1980 Sugio et al. .......................... 528/215

Primary Examiner—Lester L. Lee
Attorney, Agent, or Firm—Hedman, Casella, Gibson, Costigan & Hoare

[57] ABSTRACT

An improved method for the preparation of polyphenylene oxides is disclosed. The method comprises using a diamine catalyst system comprising a cupric compound, coupling the phenolic monomer in the absence of methanol, and adding a promoter to the reaction mixture.

7 Claims, No Drawings

PREPARATION OF POLYPHENYLENE ETHER RESINS

This invention provides a novel method for the preparation of polyphenylene oxides which is based on the oxidative coupling of phenolic monomer in the presence of monoamine or diamine catalyst systems.

BACKGROUND OF THE INVENTION

The polyphenylene ether resins and methods for their preparation are well known to the polymer art. These polymers may be made by a variety of catalytic and non-catalytic processes from the corresponding phenols or reactive derivatives thereof. By way of illustration, certain of the polyphenylene ethers and methods of preparation are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metalamine complex catalyst. Other disclosures relating to processes of preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al., U.S. Pat. No. 3,337,499; Blanchard et al., U.S. Pat. No. 3,219,626; Laakso et al., U.S. Pat. No. 3,342,892; Borman, U.S. Pat. No. 3,344,166; Hori et al., U.S. Pat. No. 3,384,619, Faurote et al., U.S. Pat. No. 3,440,217; and disclosures relating to metal-based catalysts which do not include amines, are known from patents such as Wieden et al., U.S. Pat. No. 3,442,885 (copper-amidines); Nakashio et al., U.S. Pat. No. 3,573,257 (metal-alcoholate or -phenolate); Kobayashi et al., U.S. Pat. No. 3,455,880 (cobalt chelates); and the like. All of the above-mentioned disclosures are incorporated herein by reference.

Catalyst systems based on cupric or cuprous salts and primary, secondary, or tertiary amines, with additives such as alkali or alkaline earth metal bromides and quaternary ammonium salts, have been disclosed. See, for example, Cooper et al., U.S. Pat. No. 3,733,299 and Bennett et al., U.S. Pat. No. 3,977,297, both of which are incorporated by reference. When the amine portion of the catalyst is di-n-butylamine, cupric salts are more active than cuprous salts, especially when used in conjunction with alkali or alkaline earth metal bromides. Particularly active catalyst systems are those employing cupric bromide or cupric chloride with additional sodium bromide, preferably in methanol, as a vehicle for the catalyst, with di-n-butylamine.

There are, however, some difficulties encountered in the use of these copper salt-alkali metal bromide catalysts. One difficulty is the tendency of catalyst solutions in methanol when they are allowed to contact water, to lose activity, thus requiring larger amounts of catalyst to give acceptable molecular weight in the polyphenylene oxide. Another difficulty is that the anhydrous cupric salts are not readily available commercially and are generally expensive to obtain. A third difficulty is that when methanol is used as the vehicle for the catalyst, it is extracted with the catalyst, after reaction, by aqueous solutions of acids or chelating agents, thus requiring an expensive distillation operation to recover the methanol from these aqueous solutions for economic and environmental reasons.

It has been found that an effective catalyst for the oxidative coupling can be obtained without the use of methanol, from inexpensive components, by mixing a copper oxide, preferably cuprous oxide, with concentrated aqueous hydrobromic acid and a secondary monoamine. The resulting catalyst from this mixture gives improved catalyst activity over cuprous salts, even when these cuprous salts are used in conjunction with alkali or alkaline earth metal bromides. The activity is comparable to that obtained by the use of cupric salts with alkali or alkaline earth metal bromides in methanol.

The diamine catalyst system—a combination of a copper salt with two amines, a hindered secondary diamine (N,N'-di-tert-butylethylenediamine) and a tertiary amine with low steric requirements (n-butyldimethylamine)—is highly active, typically requiring only one-half to one-third the copper concentration of the usual combinations of copper salts with monoamines. It does, however, have the disadvantage of being temperature-sensitive. If the reaction mixture is allowed to remain for more than a few minutes at temperatures greater than about 85° F., the catalyst becomes deactivated and the polymerization reaction stops. In large scale operation, limitations of heat exchanger capacity and efficiency make it very difficult to control the reaction temperature at this level during the initial, exotherm period of the reaction, during which the monomer is added to the reactor.

The temperature sensitivity of diamine catalyst systems can be decreased by adding methanol to the reaction mixture. However, when methanol is present, large amounts of water must be added to the reaction mixture in the step in which the catalyst is extracted prior to isolation of the polymer. The methanol must then be separated by distillation of the methanol-water phase.

It is desirable to be able to employ cupric salts as catalysts since these salts generally have better solubility in aqueous hydrobromic acid media, the form in which the copper is most effectively employed, and since a variety of inexpensive cupric salts are commercially available. It has been discovered that cupric salts can be effectively utilized as catalysts for the preparation of polyphenylene ethers with the diamine catalyst system in which no methanol is employed, at higher temperatures, by adding low levels of a promoter consisting of a sulfite or bisulfite salt to the catalyst premix consisting of the cupric salt and hydrobromic acid, prior to addition of this catalyst premix to the reactor.

DETAILED DESCRIPTION OF THE INVENTION

The present invention is directed to the preparation of polyphenylene ether resins, which preparation is based upon the oxidative coupling of phenolic monomer in the presence of a monoamine or diamine catalyst system. The phenolic monomer is preferably of the formula

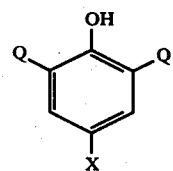

wherein X is selected from the group of hydrogen, chlorine, bromine, and iodine and Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

The preferred polyphenylene ethers are those of formula

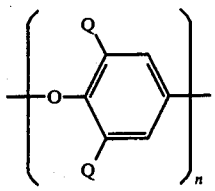

wherein the oxygen ether atom of one unit is connected to the benezene nucleus of the next adjoining unit, n is a positive integer and is at least 50, and each Q is as described above.

Examples of polyphenylene ethers corresponding to the above formula can be found in the above-referenced patents of Hay and Stamatoff. Especially preferred is poly(2,6-dimethyl-1,4-phenylene) ether.

According to this invention, a phenolic monomer is oxidatively coupled in the presence of a catalyst system comprised of a secondary monoamine plus cuprous oxide and aqueous hydrobromic acid. The useful monoamines are well known to those skilled in the art. See, for example, U.S. Pat. No. 3,965,069 and U.S. Pat. No. 4,059,468, both of which are incorporated herein by reference.

At least one and prefarably two moles of hydrobromic acid are provided for each mole of copper and the secondary monoamine to copper molar ratio is from 10:1 to 60:1.

In another embodiment, a phenolic monomer is polymerized in the presence of a diamine catalyst system. The reaction takes place in the absence of methanol and only cuprous compounds can be used alone, as the copper component of the catalyst system. Addition of a small amount, about 5 to 10%, of the total monomer charge to the solvent in the reactor before the catalyst is added, is beneficial.

The diamine catalyst is less effective when the reaction mixture contains more than a small amount of methanol or when the copper component of the catalyst is provided by a cupric compound alone rather than a cuprous compound. However, cupric compounds can be used if a sulfite or bisulfite salt is added. The sulfite or bisulfite salt can be added directly to the reactor prior to addition of the copper premix solution, if this is desired, but it is most convenient to simply dissolve the sulfite or bisulfite salt in the catalyst premix for addition with the catalyst. Any sulfite or bisulfite salt can be employed, but the sodium salts are preferred. Amounts can vary broadly but are most conveniently in the range of 0.1 to 1.0 moles of sulfite or bisulfite salt per mole of copper. The sulfite and bisulfite salts also function as promoters in the presence of cuprous compounds such as copper oxide.

The reaction may be terminated and the polymer may be recovered from the reaction mixture by the use of standard techniques such as the use of aqueous acetic acid followed by precipitation with a suitable anti-solvent such as methanol. The process may be carried out continuously in a series of reactors wherein each reactor is provided with a supply of fresh catalyst so that as the reaction solution is transferred from one reactor to another, polymer of increasing molecular weight is obtained until the desired degree of polymerization is obtained.

Generally reaction temperatures may vary between about 0° and about 50° C. Preferred temperatures will vary between about 20° to about 30° C.

Superatmospheric pressures of 1 to 40 psig or 1 to 1000 psig, or higher, may be employed if desired.

DESCRIPTION OF THE PREFERRED EMBODIMENTS

The following examples are set forth as further illustration of the invention and are not to be construed as limiting the invention thereto.

COMPARATIVE EXAMPLE 1

A mixture of 1624 ml of toluene containing 1.77 g of N,N'-di-t-butylethylene diamine, 20.8 g of N,N-dimethyl n-butyl amine, 8.14 g of di-n-butylamine, 0.53 g of trioctylmethylammonium chloride, and 106 g of 51% 2,6-xylenol in toluene was added to a one gallon reactor fitted with an agitator, cooling coil, and oxygen dip tube. To this mixture was added a catalyst consisting of 0.35 g of cuprous oxide dissolved in 2.67 g of 48% hydrobromic acid. The remaining 956 g of 51% 2,6-xylenol solution in toluene was then added over a period of 30 minutes with oxygen flow at 20 SCFH and stirring maintained at 1500 RPM. Temperature was controlled at 105° F. by addition of cooling water to the coil over the first 60 minutes of reaction and then allowed to rise to 120° F. for the remainder of the reaction. The molar ratio of 2,6-xylenol:copper:bromide was 900:1:3.2.

At 120 minutes the reaction was terminated by the addition of nitrogen to the reactor to displace oxygen, and by the addition of an excess amount of 38% ethylenediaminetetraacetic acid, trisodium salt, in water. Poly(2,6 dimethyl-1,4-phenylene oxide), i.e., PPO, was isolated by precipitation with methanol and dried to give an intrinsic viscostiy, as measured in chloroform at 30° C., of 0.62 dl/g.

COMPARATIVE EXAMPLE 2

The procedure of Comparative Example 1 was repeated, utilizing 0.48 g of cuprous chloride in the catalyst solution with 48% aqueous hydrobromic acid as replacement for the cuprous oxide. At 120 minutes the isolated PPO was found to have an intrinsic viscosity of 0.51 dl/g, as measured in chloroform at 30° C.

COMPARATIVE EXAMPLE 3

The procedure of Comparative Example 1 was repeated, utilizing 0.67 g cupric chloride in the catalyst solution with 48% aqueous hydrobromic acid as replacement for the 0.35 g of cuprous oxide. At 120 minutes the isolated PPO was found to have an intrinsic viscosity of 0.20 dl/g, as measured in chloroform at 30° C.

EXAMPLE I

The procedure of Comparative Example 1 was repeated, utilizing 0.67 g of CuCl$_2$ and 0.16 g of sodium sulfite (Na$_2$SO$_3$) with 48% hydrobromic acid in place of the cuprous oxide in the catalyst solution. The molar ratio of Na$_2$SO$_3$ to copper was 0.25 to 1. At 120 minutes the intrinsic viscosity of the isolated PPO, as measured in chloroform at 30° C., was 0.62 dl/g, the same as in Comparative Example 1.

EXAMPLE II

The procedure of Comparative Example 1 was repeated, utilizing 0.67 g of cupric chloride and 0.15 g of sodium bisulfite (NaHSO$_2$) in place of the cuprous oxide in the catalyst solution. The molar ratio of sodium bisulfite to copper was 0.29:1. The intrinsic viscosity of the isolated PPO at 120 minutes was 0.50 dl/g, as measured in chloroform at 30° C.

COMPARATIVE EXAMPLE 4

The procedure of Comparative Example 1 was repeated except that 0.67 g of cupric chloride was employed in place of cuprous oxide, with various reducing agents added to the reaction mixture at a molar ratio of 0.25:1, reducing agent to copper. Intrinsic viscosity at 120 minutes of resulting PPO samples prepared with different reducing agents is summarized in the table below.

TABLE 1

| Sample | Reducing Agent | I.V. at 120 mins. (dl/g) |
|---|---|---|
| A | Sodium Hypophosphite | 0.32 |
| B | Dimethyl Phosphite | 0.29 |
| C | Sodium Dithionate | 0.34 |

The above illustrates that other common reducing agents are not effective to the extent that sulfites or bisulfites are in promoting cupric chloride catalyzed reactions. This suggests that the effect is not simply a reduction of cupric ion to cuprous ion.

Obviously, other modifications and variations of the present invention are possible in the light of the above teachings. It is, therefore, to be understood that changes may be made in the particular embodiments described above which are within the full intended scope of the invention as defined in the appended claims.

I claim:

1. In a process for the preparation of a polyphenylene oxide resin by the oxidative coupling of a phenolic monomer in the presence of oxygen and a diamine catalyst system, the improvement which comprises using a diamine catalyst system comprising a cupric salt, coupling the phenolic monomer in the absence of methanol, and adding a promoter consisting essentially of a sulfite or bisulfite salt to the reaction mixture.

2. The process of claim 1 wherein the cupric salt is cupric chloride.

3. The process of claim 1, wherein the promoter is an alkali metal sulfite or bisulfite.

4. The process of claim 3 wherein the promoter is sodium sulfite or sodium bisulfite.

5. The process of claim 1 wherein the phenolic monomer is a compound of formula

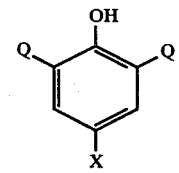

wherein X is selected from the group of hydrogen, chlorine, bromine, and iodine and Q is a monovalent substituent selected from the group consisting of hydrogen, halogen, hydrocarbon radicals free of tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

6. The process of claim 1 wherein the diamine catalyst system also comprises a hindered secondary diamine and a tertiary amine with low steric requirements.

7. The process of claim 6 wherein the diamine catalyst system also comprises N,N'-di-tert-butylethylene diamine and n-butyldimethylamine.